United States Patent [19]

Avellis et al.

[11] 4,192,183
[45] Mar. 11, 1980

[54] PRESSURE RATIO TRANSDUCER SYSTEM

[75] Inventors: Cosmo L. Avellis, Northridge; Carlo Pavone, Los Angeles; Albertus Wolfkamp, Canoga Park, all of Calif.

[73] Assignee: Edcliff Instruments, Monrovia, Calif.

[21] Appl. No.: 878,676

[22] Filed: Feb. 17, 1978

[51] Int. Cl.² .......................... G01C 21/10; G01L 9/10
[52] U.S. Cl. .......................................... 73/182; 73/722
[58] Field of Search ................ 73/182, 722, 728, 723; 340/199; 336/30; 364/558, 443

[56] References Cited

U.S. PATENT DOCUMENTS

| 2,806,353 | 9/1957 | Grafinger et al. | 73/182 |
| 3,209,593 | 10/1965 | Johnson | 73/182 |
| 3,443,080 | 5/1969 | Spencer | 364/558 |
| 3,805,617 | 4/1974 | Kamazuka | 73/728 |
| 3,848,180 | 11/1974 | Jonke et al. | 73/728 |

Primary Examiner—Donald O. Woodiel
Attorney, Agent, or Firm—Flehr, Hohbach, Test, Albritton & Herbert

[57] ABSTRACT

Pressure ratio transducer system in which input pressures are converted to electrical signals and the electrical signals are processed to produce an output signal corresponding to the ratio of the input pressures. The system is particularly suitable for use in an aircraft for determining the ratio of the change in pressure due to motion of the aircraft to the static pressure in the air surrounding the aircraft.

15 Claims, 6 Drawing Figures

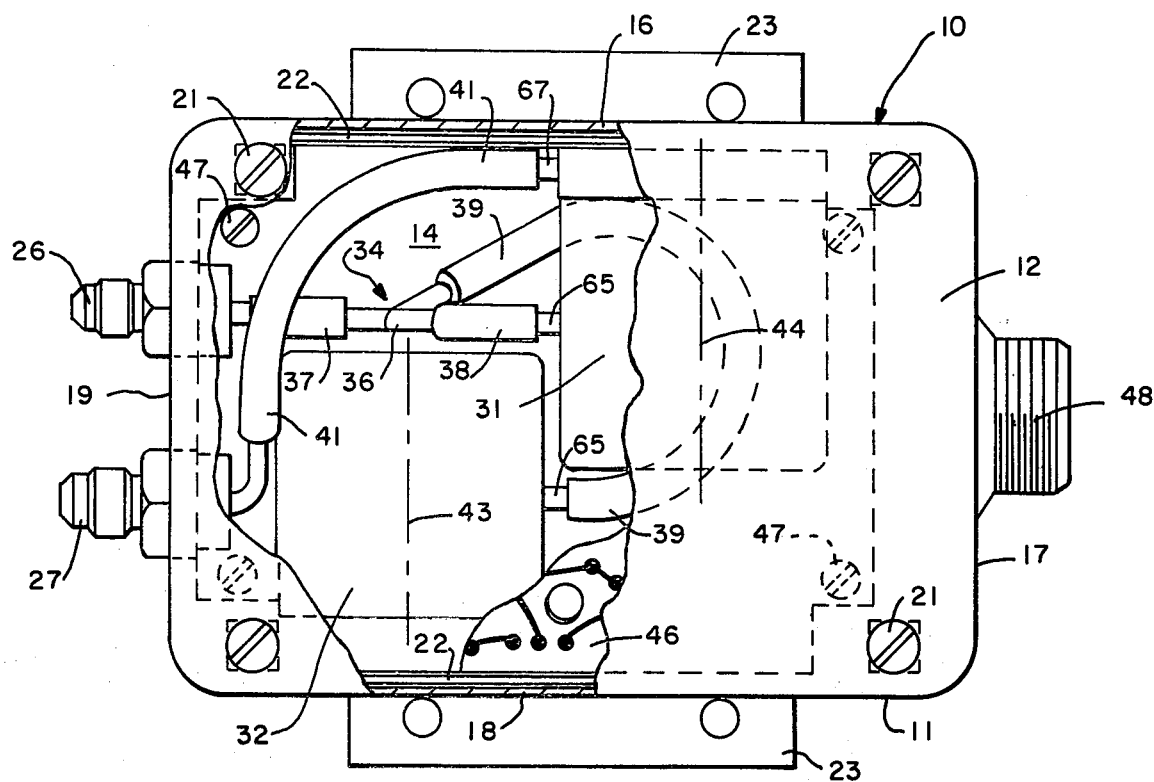
FIG.—1
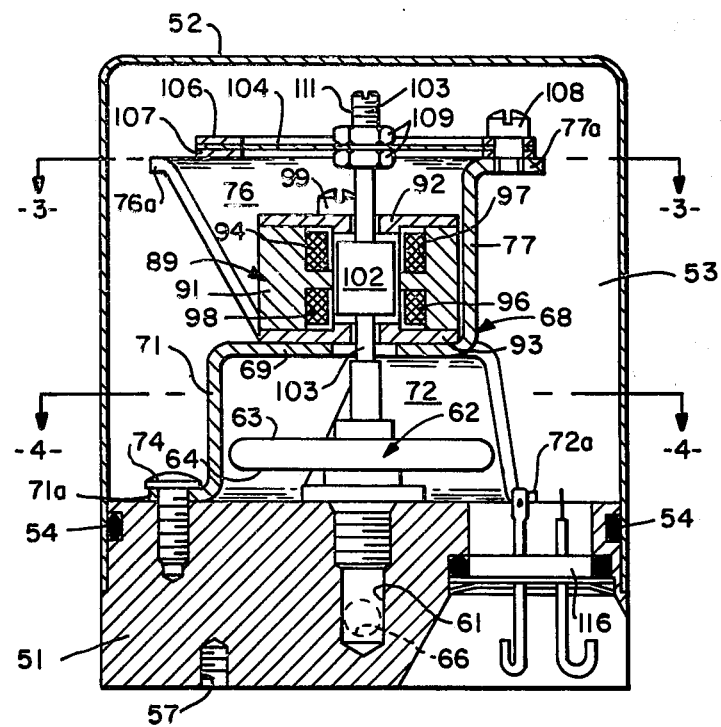
FIG.—2

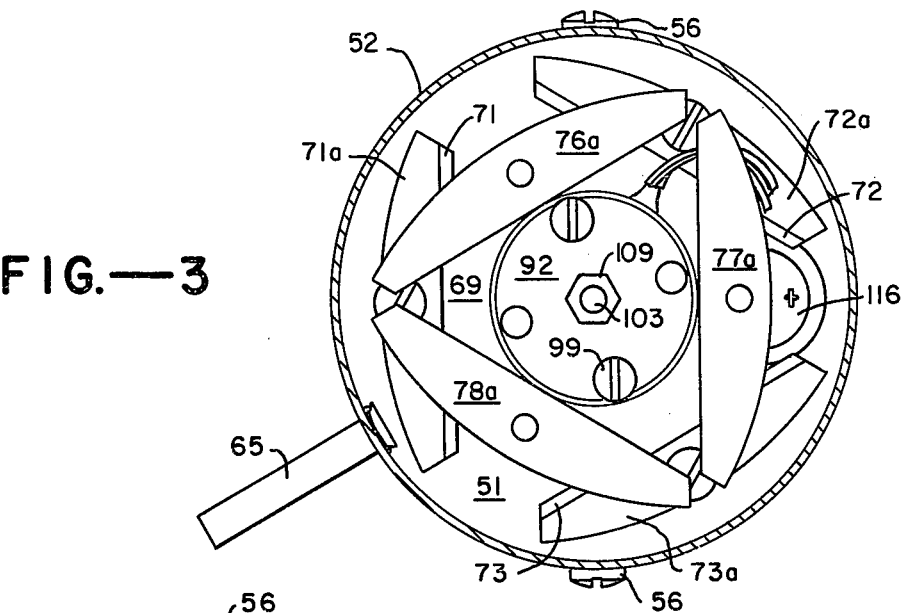
FIG.—3
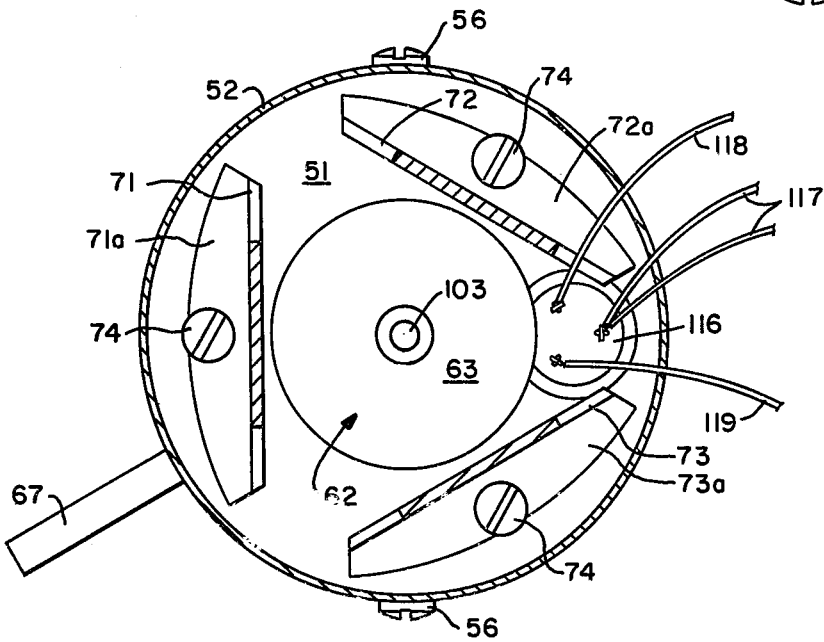
FIG.—4
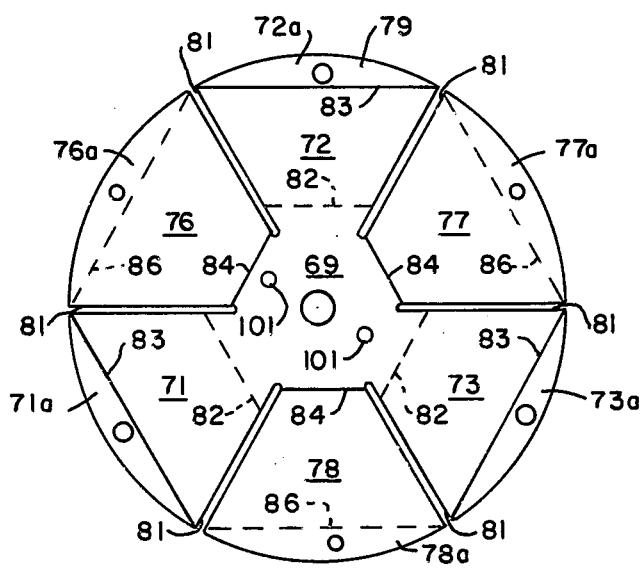
FIG.—5

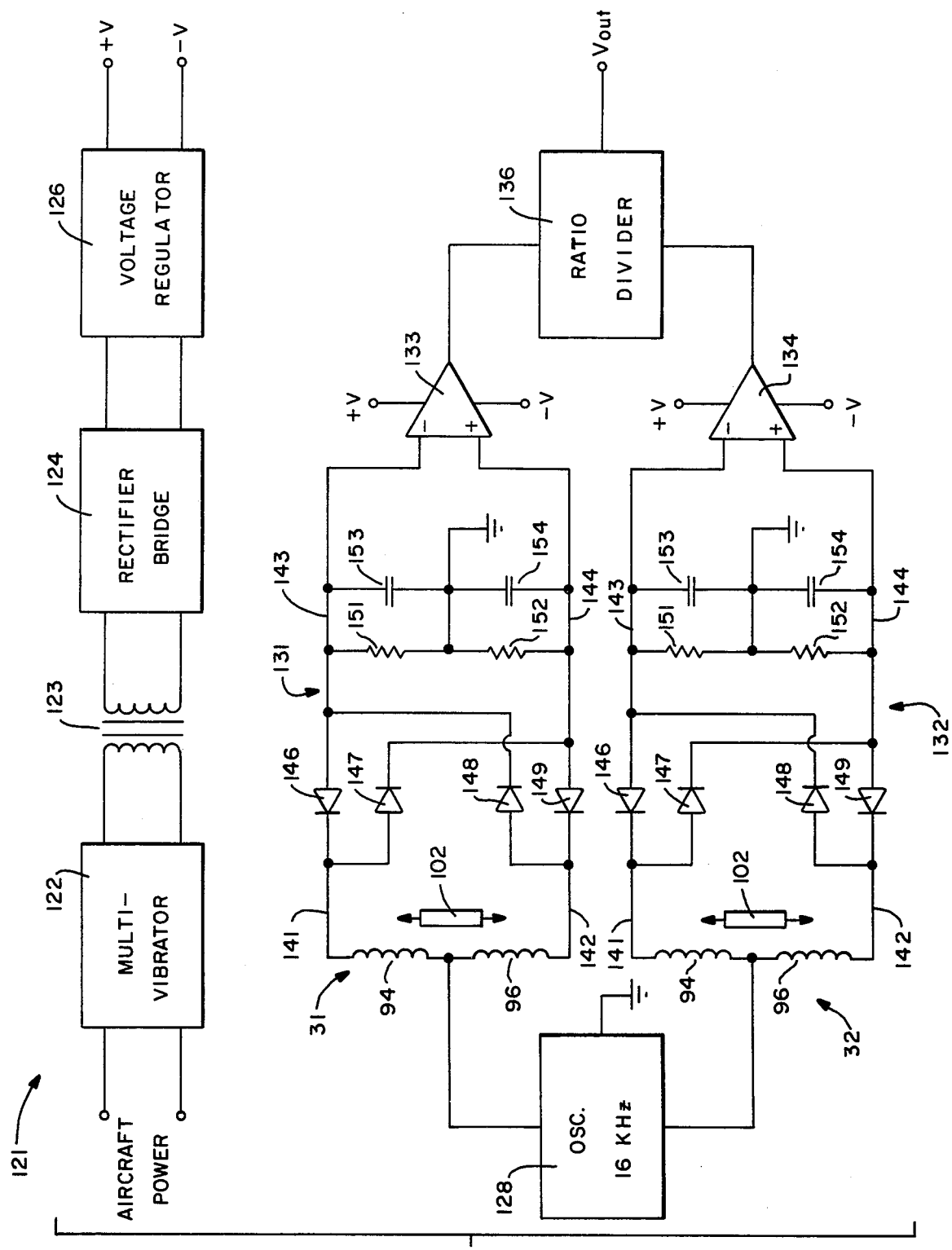
FIG.—6

PRESSURE RATIO TRANSDUCER SYSTEM

BACKGROUND OF THE INVENTION

This invention pertains generally to pressure transducers and more particularly to a transducer system which is particularly suitable for use in connection with the pitot system and the air data computer of an aircraft.

The pitot system of an aircraft provides pressures which can be utilized to determine Mach number and other aircraft data. These pressures generally include the static pressure $P_s$, which is the absolute pressure of the ambient still air at the altitude of the aircraft, and the total pressure $P_t$, which is the sum of the static pressure and the rise in pressure due to aircraft motion. Altitude is a nonlinear function of static pressure, and airspeed and Mach number are non-linear functions of the pressure $Q_c$, which is the difference between total pressure and static pressure. The pressure $Q_c$ represents the pressure rise due to motion of the aircraft and it is commonly known by several names including ram pressure, impact pressure and dynamic pressure. Mach number is defined as the ratio of the true airspeed to the speed of sound in ambient air, and this ratio can be closely approximated by $Q_c/P_s$.

Heretofore, there have been several attempts to provide mechanical transducers having an output motion corresponding to $Q_c/P_s$. Such transducers generally include a first diaphragm which has $P_t$ and $P_s$ applied to opposite sides so that it moves in accordance with $Q_c$, a second diaphragm which moves in response to $P_s$, and a linkage which responds to the motion of the two diaphragms to provide an output motion corresponding to the ratio of the diaphragm motions. The motion of the linkage is monitored by an electromechanical transducer which provides an output signal corresponding to the desired ratio. This approach has certain disadvantages. For example, the linkage gives rise to friction and backlash which result in errors in the output signal. In addition, the linkage constitutes an inertia load on the diaphragms which causes additional error during vibration or acceleration.

SUMMARY AND OBJECTS OF THE INVENTION

The invention provides a pressure ratio transducer system utilizing first and second variable inductance transducers which are energized by an oscillator to provide electrical signals which corresponds to static pressure and the difference between total pressure and static pressure. These signals are processed electronically to produce an output signal corresponding to $Q_c/P_s$. Each transducer includes two coil sections which are energized in push-pull fashion, and the processing circuitry includes a differentiating full-wave demodulator for each transducer and a ratio divider which delivers an output signal corresponding to the ratio of the demodulated transducer signals. The oscillator, transducers and processing circuitry are mounted in a compact housing, with the transducers oriented in opposite directions along parallel axes to cancel the effects of aircraft movement on the cores which control the inductance of the coils in the transducers. Each transducer has a rigid internal frame fabricated from a single, planar sheet.

It is in general an object of the invention to provide a new and improved transducer system.

Another object of the invention is to provide a transducer system of the above character which is particularly suitable for detecting the ratio of $Q_c/P_s$ in an aircraft.

Another object of the invention is to provide a transducer system of the above character which can be manufactured and maintained economically.

Additional objects and features of the invention will be apparent from the following description in which the preferred embodiment is set forth in conjunction with the accompanying drawings.

BRIEF DESCRIPTION OF THE DRAWINGS

FIG. 1 is a top plan view, partly broken away, of one embodiment of a transducer system incorporating the invention.

FIG. 2 is a centerline sectional view of one of the transducers in the system of FIG. 1.

FIG. 3 is a cross sectional view taken along line 3—3 in FIG. 2.

FIG. 4 is a cross sectional view taken along line 4—4 in FIG. 2.

FIG. 5 is a plan view of the sheet from which the frame of the transducer of FIGS. 2-4 is formed.

FIG. 6 is a circuit diagram, partly in block form, of the transducer system of FIG. 1.

DESCRIPTION OF THE PREFERRED EMBODIMENT

As best seen in FIG. 1, the transducer system includes a generally rectangular housing 10 having a base portion 11 and a cover 12. The base portion is formed as a unitary structure and includes a generally planar bottom wall 14 and up-standing side walls 16-19. Cover 12 is removably mounted on the upper portions of the side walls and secured by screws 21. An o-ring gasket 22 provides a seal between the cover and the base. A mounting bracket 23 is attached to the bottom wall of the base for mounting the system on a suitable support.

Inlet fittings 26, 27 are mounted on housing wall 19 for connection to the sources of pressure to be monitored. In the case of an aircraft pitot system, the static pressure $P_s$ is applied to fitting 26, and the total pressure $P_t$ is applied to fitting 27.

Pressure responsive transducers 31, 32 are mounted within housing 10 on side walls 16, 18. As discussed more fully hereinafter, each of these transducers includes a pressure responsive capsule, an output coil, and a movable core which is connected to the capsule for varying the inductance of the coil in accordance with the pressure applied to the capsule. Transducer 31 is a differential transducer which provides an output signal corresponding to the difference between pressures applied to the interior and exterior of the capsule. In transducer 32, the interior of the capsule is maintained at a full vacuum, and the output signal of this transducer corresponds to the pressure applied externally to the capsule. Inlet fitting 26 is connected to transducers 31, 32 by a flow line 34 comprising a Y-connector 36, a section of tubing 37 which extends between fitting 26 and connector 36, and tubing sections 38, 39 which extend from connector 36 to transducers 31, 32, respectively. Inlet fitting 27 is connected to transducer 31 by a flow line 41. In the preferred embodiment, flow line sections 37-39 are fabricated of a flexible material such as Tygon tubing.

Transducers 31, 32 are mounted on parallel axes 43, 44 which are preferably aligned with the axis of movement of the aircraft. The transducers face in opposite directions, and the inertia effects of aircraft movement on the transducer cores tend to cancel each other.

Circuitry for energizing the transducers and processing the output signals from the transducer is mounted on a circuit board 46. The transducers are positioned in the lower portion of the housing, and the circuit board is positioned above the transducers adjacent to cover 12. The circuit board is mounted on posts (not shown) and secured thereto by screws 47. An electrical connector 48 is mounted on housing wall 17 and provides means for connecting the transducer system to other electrical systems such as a power source and the air data computer.

Transducers 31, 32 are of generally similar structure which is illustrated in FIGS. 2-4. Each of the transducers includes a generally circular base 51 and a generally cylindrical cover 52 mounted on the base to form a closed chamber 53. An O-ring 54 provides a seal between the cover and base, and the cover is secured to the base by screws 56. Threaded mounting holes 57 are provided in the base for receiving screws (not shown) by which the transducers are secured to walls 16, 18.

A blind axial bore 61 extends downwardly from the upper surface of base 51. A sealed capsule assembly 62 is mounted on base 51 and threadly received in the upper portion of bore 61. The capsule assembly includes upper and lower flexible diaphragms 63, 64 and an internal chamber which communicates with bore 61. A radial bore 66 in base 51 communicates with the capsule chamber via bore 61. In differentail transducer 31, the total pressure $P_t$ is applied to the capsule chamber via bore 66 and a nipple 67 which extends from the outer end of the bore. In transducer 32, the capsule chamber is maintained at full vacuum, and bore 66 is sealed.

In both transducers, a short pipe or nipple 65 entends outwardly from the side wall of cover 52 to provide an inlet passageway to chamber 53. The pipe extends through an opening in the side wall and is secured to the wall by suitable means such as soldering.

A rigid frame 68 is also mounted on the upper surface of base 51. This frame includes a central portion or platform 69 which is spaced from and generally parallel to the upper surface of base 51. Peripherally spaced, planar legs 71-73 extend downwardly at right angles from the central portion of the frame. Flanges 71a-73a extend outwardly at right angles from the lower portions of leg 71-73 and receive mounting screws 74 which secure the frame to the base. The frame also includes legs 76-78 which are positioned between legs 71-73 and extend upwardly at right angles from central portions 69. Flanges 76a-78a extend outwardly at right angles from the upper portions of legs 76-78.

In the preferred embodiment, frame 68 is formed as a unitary structure from a generally circular sheet 79 of a suitable material such as brass. The manner in which the frame is formed is best understood with reference to FIG. 5. Radial cuts 81 converge inwardly from the periphery toward the central portion of the sheet. Alternate ones of the sections formed between cuts 81 are bent downwardly along fold lines 82 which extend between the cuts to form legs 71-73. The outer portions of these sections are bent upwardly along lines 83 parallel to lines 82 to form flanges 71a-73a. The remaining sections between cuts 81 are bent upwardly along fold lines 84 to form legs 76-78, and the outer portions of these sections are bent downwardly along lines 86 to form flanges 76a-78a.

A coil assembly 89 is mounted on the platform or central portion frame 68. The coil assembly comprises a generally cylindrical body 91 and end plates 92, 93, all of which are fabricated of a material having a relatively high magnetic permeability. Windings 94, 96 are mounted in axially spaced annular recesses 97, 98 in body 91. As discussed more fully hereinafter, these windings are connected electrically in series and energized in push-pull fashion. The coil assembly is held together and secured to frame 68 by screws 99 which engage threaded holes 101 in the central portion or platform of the frame.

Means is provided for varying the inductance of coil sections or windings 94, 96 in accordance with the pressure applied to capsule 62. The means includes a movable core of magnetic material 102 which is mounted on a rod 103 and positioned coaxially of the coil sections. The lower end of rod 103 is connected to diaphragm 63 whereby the position of the core is dependent upon the pressure applied to the capsule.

A generally circular leaf spring 104 is mounted on the upper ends of frame legs 76-78 and secured to flanges 76a-78a by clamping rings 106, 107 and screws 108. The upper portion of rod 103 is secured to spring 104 by nuts 109. The spring urges the core toward a rest position which can be adjusted by changing the position of nuts 109 on rod 103.

A feedthrough connector 116 mounted in base 51 provides means for making external connections to windings 94, 96. Leads 117 extend from the connector to the inner or common ends of the windings, and leads 118, 119 connect to the outer ends of the windings.

Material for and construction of the different parts used to make up the transducer assemblies are preferably chosen in such a way that the expansion due to the thermal coefficients of the stationary parts equal or closely match the thermal coefficient of expansion of the movable parts. As a result, little or no error is introduced by mechanical sources due to changes in temperature.

Referring now to FIG. 6, operating power for the transducer system is obtained from the aircraft power system by means of a power supply 121. The aircraft power source typically provides a D.C. voltage on the order of 28 volts, and this voltage is applied to a multivibrator or chopper 122 which produces a square wave at a frequency on the order of 3 KHz. The output of the multivibrator is connected to the primary winding of an isolation transformer 123, and the secondary winding of this transformer is connected to the input of a rectifier bridge circuit 124. The output of this circuit is connected to the input of a voltage regulator 126 which delivers output voltages $+V$ and $-V$ which are isolated from the aircraft power system by transformer 123.

The two windings or coil sections 94, 96 in each transducer are connected electrically in series, and means is provided for energizing the coil sections of each transducer in push-pull fashion. This means includes an oscillator 128 which, in the preferred embodiment, is a sine wave oscillator operating at a frequency on the order of 16-17 KHz. As illustrated, the oscillator is connected between system ground and the junction of the coil sections in each transducer. The outer ends of the coil sections are connected to the inputs of demodulators 131, 132. The outputs of the demodulators are connected to the inputs of differential amplifiers 133, 134, and the outputs of these amplifiers are connected to the inputs of a ratio divider 136. In the preferred embodiment, the ratio divider comprises an analog divider which delivers an output signal corresponding to the signal from amplifier 133 divided by the signal from amplifier 134.

Demodulators 131, 132 are substantially identical, and each comprises a full-wave rectifier bridge network which delivers two output signals of the same sense. Each bridge network includes input terminals 141, 142, output terminals 143, 144 and diodes 146-149. As illustrated, the cathode of diode of 146 is connected to input terminal 141, and the anode of this diode is connected to output terminal 143. The anode of diode 147 is connected to input terminal 141, and the cathode of this diode is connected to output terminal 144. The anode of diode 148 is connected to input terminal 142, and the cathode of this diode is connected to output terminal 143. The cathode of diode 149 is connected to input terminal 142, and the anode of this diode is connected to output terminal 144. Resistors 151, 152 are connected between output terminals 143, 144 and ground, and capacitors 153, 154 are likewise connected between the output terminals and ground.

Operation and use of the transducer system is as follows. It is assumed that the system is connected to the aircraft pitot system and that total pressure $P_t$ and static pressure $P_s$ are applied to inlet fittings 26 and 27, respectively. In differential transducer 31, the total pressure is applied to the interior of capsule 62 and the static pressure is applied to the exterior of the capsule. Since the total pressure is greater than the static pressure, diaphragm 63 is deflected in an upward direction by an amount corresponding to the difference between the applied pressures, i.e. $P_t - P_s$. Movement of core 102 in the upward direction tends to increase inductance of coil section 94 while decreasing the inductance of coil section 96.

In transducer 32, the interior of capsule 62 is maintained at a vacuum or zero pressure level, and the static pressure $P_s$ is applied to the exterior of the capsule. This produces a downward deflection of diaphragm 63 corresponding to the level of the applied pressure $P_s$. Downward movement of the tuning core increases the inductance of coil section 96 and decreases the inductance of coil section 94.

The output signals from the transducer coils are rectified by the bridge networks in demodulators 131, 132. The polarities of diodes 146-149 are such that the signal produced at output terminal 143 is always of the same sense as the signal produced at output terminal 144. Thus, during positive half cycle of the oscialiator signal, diodes 147 and 148 conduct, and the output signals are both positive. During negative half cycles, diodes 146 and 149 conduct, and both outputs are negative.

At any given instance, the outputs of demodulator 131 differ by an amount corresponding to $P_t - P_s$, or $Q_c$, and differential amplifier 133 provides an output signal corresponding to this difference. Likewise, the outputs of demodulator 132 differ by an amount corresponding to $P_s$, and differential amplifier 134 delivers an output signal corresponding to this pressure. Ratio divider 136 combines the $Q_c$ output from amplifier 133 with the $P_s$ output from amplifier 134 to provide an output signal corresponding to $Q_c/P_s$. This signal closely approximates the Mach number and can be applied to the air data computer or otherwise utilized as desired.

The transducer system has a number of important features and advantages. As noted above, it can be utilized in conjunction with an aircraft pitot system to provide an output signal corresponding to Mach number. It overcomes the problems of friction and inertia which limit the accuracy of prior art systems utilizing mechanical linkages. In addition, the system is immune to problems of temperature variation, since any effects of electrical temperature drift are essentially cancelled in the differential demodulator circuits.

It is apparent from the foregoing that a new and improved transducer system has been provided. While only the presently preferred embodiment has been described in detail, as will be apparent to those familiar with the art, certain changes and mofifications can be made without departing from the scope of the invention as defined by the following claims.

What is claimed is:

1. In an aircraft pressure transducer system for providing an output signal corresponding to $(P_t - P_s)/P_s$, where $P_t$ is the total pressure in the aircraft pitot system and $P_s$ is the static air pressure at the altitude of the aircraft: first and second transducers each having an output coil with a core for varying the inductance of the coil in accordance with the pressure applied to the transducer, an oscillator connected to the transducer coils for energizing said coils with an electrical signal of generally sinusoidal waveform and a frequency on the order of 16-17 KHz, means for applying the total pressure and the static pressure to the first transducer to produce an output signal in the coil therein corresponding to $P_t - P_s$, means for applying the static pressure to the second transducer to produce an output signal in the coil therein corresponding to $P_s$, and electronic signal processing means having no moving parts responsive to the transducer output signals for delivering an output signal corresponding to $(P_t - P_s)/P_s$.

2. The transducer system of claim 1 wherein each of the transducers includes a pair of axially separated coil sections which are energized by the oscillator signal, the core being movable axially between the coil sections for simultaneously increasing the inductance of one section and decreasing the inductance of the other section.

3. In an aircraft pressure transducer system for providing an output signal corresponding to $(P_t - P_s)/P_s$, where $P_t$ is the total pressure in the aircraft pitot system and $P_s$ is the static air pressure at the altitide of the aircraft: first and second transducers each having an output coil with a core for varying the inductance of the coil in accordance with the pressure applied to the transducer, an oscillator connected to the transducer coils for energizing said coils with an electrical signal of predetermined frequency, means for applying the total pressure and the static pressure to the first transducer to produce an output signal in the coil therein corresponding to $P_t - P_s$, means for applying the static pressure to the second transducer to produce an output signal in the coil therein corresponding to $P_s$, first and second demodulators connected to the transducer coils, and ratio divider means responsive to the demodulated transducer output signals for delivering an output signal corresponding to $P_t - P_s/P_s$.

4. The transducer system of claim 3 wherein the coil in each of the transducers includes two sections connected electrically in series for energization by the oscillator in push-pull fashion, and each of the demodulators includes a rectifying bridge network connected across the serially connected coil sections for delivering first and second output signals of like sense, together with means responsive to the first and second output signals for delivering a signal to the ratio divider means corresponding to the difference between said first and second signals.

5. In a transducer system for providing an electrical output signal having a predetermined relationship to first and second input pressures: a generally rectangular housing, input fittings mounted on the housing for connection to sources of the first and second pressures, first and second transducers having output coils with axially movable cores for varying the inductances of the coils in accordance with the pressures applied to the transducers, means mounting the transducers in the housing with the axis of the coil in the first transducer generally parallel to the axis of the coil in the second transducer, flow lines interconnecting the input fittings and the transducers, oscillator means mounted in the housing for energizing the transducer coils, and signal processing means within the housing connected to the transducer coils for delivering the output signal.

6. The transducer system of claim 5 wherein the flow lines are fabricated of flexible tubing.

7. The transducer system of claim 5 wherein the housing comprises a base section including a bottom wall with adjoining side walls and a cover mounted on the upper portions of the side walls, the transducers being mounted on opposite ones of the side walls with their axes generally parallel to the bottom wall, the inlet fittings being mounted on a side wall intermediate the walls on which the transducers are mounted, and the signal processing means being mounted on a generally planar circuit board adjacent to the cover.

8. In a transducer for providing an electrical output signal corresponding to an input pressure: a generally circular base, a generally cylindrical cover mounted on the base and therewith forming a sealed chamber, a pressure responsive capsule mounted in the chamber adjacent to the base, a rigid frame having a generally planar central portion spaced from the base with a first group of generally planar legs extending toward the base and a second group of generally planar legs extending away from the base, means securing the first group of legs to the base, an output coil mounted on the central portion of the frame, a movable core for varying the inductance of the coil, means connecting the capsule to the core for varying the inductance of the coil in accordance with the pressure applied to the capsule, and resilient means mounted on the second group of legs and connected to the core for yieldably urging the core toward a rest position.

9. The transducer of claim 8 wherein the resilient means comprises a generally planar spring, the outer portion of said spring being secured to the legs of the frame and the central portion of the spring being connected to the core.

10. The transducer of claim 8 wherein the frame is a unitary structure formed from a generally circular sheet of rigid material by the steps of making a plurality of cuts which converge inwardly from the periphery toward the central portion of the sheet and bending alternate portions of the sheet between the cuts in opposite directions along fold lines between the cuts to form the legs.

11. The transducer of claim 10 wherein the outer portions of the legs are bent at right angles to the remaining portions of the legs to form flanges which are generally parallel to the central portion of the frame.

12. In a transducer system: an oscillator for providing a signal of predetermined frequency, an impedance element having first and second sections connected to the oscillator for energization by the oscillator signal in a push-pull fashion, means for varying the reactance of the impedance element in accordance with an input parameter, a rectifying bridge network connected to the impedance element for delivering first and second output signals of like sense, and means responsive to the first and second signals.

13. The transducer system of claim 12 wherein the impedance element comprises a coil having two axially separated sections and the means for varying the reactance comprises a core movable axially of the coil sections.

14. The transducer system of claim 12 wherein the bridge network comprises first and second input terminals connected to the impedance element, first and second output terminals, first and second diodes having their anodes connected respectively to the first and second input terminals and their cathodes connected respectively to the first and second output terminals, and third and fourth diodes having their cathodes connected respectively to the first and second input terminals and their anodes connected respectively to the second and first output terminals.

15. In an aircraft pressure transducer system for providing an output signal corresponding to $(P_t - P_s)/P_s$, where $P_t$ is the total pressure in the pitot system and $P_s$ is the static air pressure at the altitude of the aircraft: first and second transducers each comprising a base, a pressure responsive movable member mounted on the base and forming one wall of a chamber to which input pressure is applied, a rigid frame having a generally planar central portion parallel to the base with first and second groups of generally planar legs extending from the central portion toward and away from the base, means securing the free ends of the first group of legs to the base, an output coil mounted on the central portion of the frame in axial alignment with the movable member, a core for varying the inductance of the coil, an axially movable rod carrying the core and connected to the movable member for varying the position of the core in accordance with the pressure applied to the movable member, and a resilient member secured to the outer ends of the second group of legs and connected to the core for yieldably urging the core toward a predetermined rest position; an oscillator connected to the transducer coils for energizing said coils with an electrical signal of predetermined frequency; means for applying the total pressure and the static pressure to the first transducer to produce an output signal in the coil therein corresponding to $P_t - P_s$; means for applying the static pressure to the second transducer to produce an output signal in the coil therein corresponding to $P_s$, and electronic signal processing means having no moving parts responsive to the transducer output signals for delivering an output signal corresponding to $(P_t - P_s)/P_s$.

* * * * *